No. 676,302. Patented June 11, 1901.
S. J. COLBY.
OUTSIDE WATER CLOSET.
(Application filed Dec. 10, 1900.)
(No Model.)
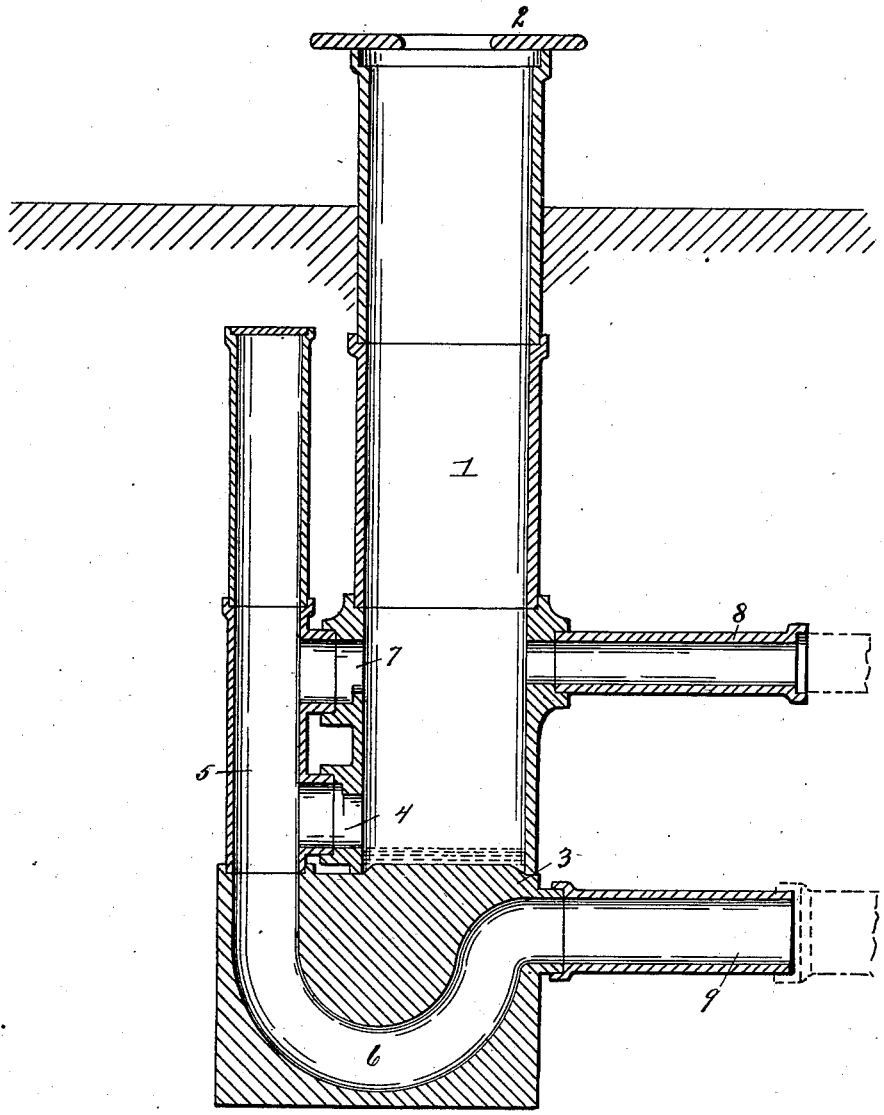
WITNESSES.
INVENTOR.
Sheridan J. Colby
By
Attorneys.

UNITED STATES PATENT OFFICE.

SHERIDAN J. COLBY, OF DETROIT, MICHIGAN.

OUTSIDE WATER-CLOSET.

SPECIFICATION forming part of Letters Patent No. 676,302, dated June 11, 1901.

Application filed December 10, 1900. Serial No. 39,323. (No model.)

*To all whom it may concern:*

Be it known that I, SHERIDAN J. COLBY, a citizen of the United States, residing at Detroit, in the county of Wayne, State of Michigan, have invented certain new and useful Improvements in Outside Water-Closets; and I do declare the following to be a full, clear, and exact description of the invention, such as will enable others skilled in the art to which it appertains to make and use the same, reference being had to the accompanying drawing, and to the figures of reference marked thereon, which form a part of this specification.

This invention relates to water-closets; and it consists in the construction and arrangement of parts hereinafter fully set forth, and pointed out particularly in the claims.

The objects of the invention are to produce a closet of the class described of simple and inexpensive construction in which the arrangement is such as to prevent a stoppage or clogging of the pipes or trap connecting the vault or catch-basin with the sewer, to prevent any substance too large to pass through the trap from getting out of the vault or where it will be difficult to remove it, to prevent the passage from the vault of any substance large enough to clog the trap or crocks leading to the sewers, to provide a vent for and means of ready access to the trap when desired, and to prevent the vault from overflowing or filling with water above the bottom of the inlet water-pipe 8.

The above objects are attained by the construction illustrated in the accompanying drawing, in which the figure shown is a central vertical section through the vault or catch-basin and trap and the parts connected therewith.

Referring to the characters of reference, 1 designates a cylindrical vault or catch-basin, which is formed of joined sections of vitrified clay or other material suitable for making ordinary sewer-crocks. The vault may be of any desired depth, shape, or size, but should be such depth below the surface as to place the connected water-pipes below the frost-line. The top of the vault extends above the ground and supports the closet-seat 2. The vault should be of uniform diameter and large enough to prevent the lodgment of excrement on the sides thereof. The bottom section of the vault rests upon a suitable base-support 3 and is so cemented that the bottom of the vault is rendered water-tight. Formed in the side wall of the vault slightly above the bottom is an aperture 4, and above that any distance desired is another aperture 7, which apertures communicate with a vertical crock-pipe 5 through suitable connections and T-couplings. Such apertures or openings are enough smaller than such vertical crock 5 and the connections between the same so that any substance which will pass through either of said openings will be substantially certain to pass through the trap into the sewer. The lower end of the crock or pipe 5 communicates with a trap 6 of the same diameter formed in the base 3, and the upper end of said crock or pipe 5 extends to or nearly to the surface and affords access to the trap for the purpose of cleaning out and may also be made to serve as a vent, if desired.

The opening 4 in the wall of the vault is slightly above the bottom thereof, so as to cause an accumulation of water to a slight depth at the bottom of the vault.

The water-pipe 8, leading from the sink or waste-pipe, communicates with the vault at any point desired, but should not be lower than the level of the upper discharge-opening 7.

Connected with the discharge end of the trap is a pipe 9, which leads to the sewer. (Not shown.)

The slight water-basin at the bottom of the vault prevents the adhering of accumulated substances thereon, so that under ordinary conditions the vault is kept clean by the flow of water from the waste-pipe 8 into the vault and out the lower discharge-opening 4. The diameter of said discharge-opening being smaller than that of the pipe 5 and the connected trap 6, any substance sufficiently large to clog the trap is prevented from passing through said opening. Should any substance be thrown into the vault too large to pass out said opening 4, whereby said opening becomes clogged through the lodging of the substance therein, the vault will not overflow, owing to the fact that when filled up to the level of the opening 7 the water will pass out of said opening, thereby preventing the vault from becoming filled to an extent to cause the water to back up in the waste-pipe 8 or overflow the seat. Upon the removal of the substance which clogs the opening 4 the accumulated contents will be discharged through said opening, leaving the vault free, as before.

Owing to the fact that the openings 4 and 7 are somewhat smaller than the diameter of the trap any substance which will pass through said openings will also pass freely through the trap, so that said trap will not become clogged under ordinary conditions. Should it transpire, however, that the trap becomes clogged, ready access is afforded thereto through the medium of the upright crock or pipe 5, whereby the trap may be easily cleaned.

Instead of forming the trap in a base, as shown, it may be formed of ordinary sewer-crock and connected with the pipes 5 and 9 in any suitable manner. Instead of supporting the catch-basin or vault upon a base 3, as shown, said basin may be simply set in the ground and its lower end rendered water-tight by any suitable means.

Instead of connecting the vault 1 and the vertical pipe 5 by a straight coupling they may be connected by means of curves or elbows leading out of the vault.

Having thus fully set forth my invention, what I claim as new, and desire to secure by Letters Patent, is—

1. In a water-closet, the combination of a vault having a solid bottom and two lateral discharge-openings through the wall thereof located one above the other, a trap communicating with the sewer, suitable coupling-pipes connecting said discharge-openings independently with said trap and a water-pipe communicating with said vault.

2. In a water-closet, the combination of a vault having a solid bottom and two discharge-openings through the wall thereof, located at different levels, a trap communicating with the sewer, suitable coupling-pipes connecting said discharge-openings with said trap, said discharge-openings being restricted so that any substance passing therethrough will pass freely through the connecting-pipes and trap, and a water-pipe communicating with the vault at a point not below the level of the upper of said discharge-openings.

In testimony whereof I sign this specification in the presence of two witnesses.

SHERIDAN J. COLBY.

Witnesses:
E. S. WHEELER,
C. EDNA JOSLIN.